US008462904B2

(12) United States Patent
Guo et al.

(10) Patent No.: US 8,462,904 B2
(45) Date of Patent: Jun. 11, 2013

(54) METHODS AND APPARATUS FOR ENHANCING CHANNEL ESTIMATION

(75) Inventors: Zhiheng Guo, Beijing (CN); Hai Wang, Beijing (CN); Ruiqi Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 271 days.

(21) Appl. No.: 13/031,812

(22) Filed: Feb. 22, 2011

(65) Prior Publication Data
US 2011/0206169 A1 Aug. 25, 2011

Related U.S. Application Data

(63) Continuation of application No. PCT/CN2010/000215, filed on Feb. 17, 2010.

(51) Int. Cl.
*H04B 1/10* (2006.01)
(52) U.S. Cl.
USPC ......................................................... 375/350
(58) Field of Classification Search
USPC .................. 375/260, 316, 346, 350; 370/208, 370/210
See application file for complete search history.

(56) References Cited

U.S. PATENT DOCUMENTS

| 7,668,076 | B2 * | 2/2010 | Yoshida et al. | 370/208 |
| 8,102,922 | B2 * | 1/2012 | Chang | 375/241 |
| 2011/0069798 | A1 * | 3/2011 | Lo et al. | 375/350 |

FOREIGN PATENT DOCUMENTS

| CN | 101267421 A | 9/2008 |
| CN | 101588330 A | 11/2009 |
| JP | 2008028515 A | 2/2008 |

OTHER PUBLICATIONS

PCT Search Report, mailed Nov. 25, 2010, in connection with International Application No. PCT/CN2010/000215.
PCT Written Opinion, mailed Nov. 25, 2010, in connection with International Application No. PCT/CN2010/000215.
Shaopeng Feng et al. "DCT-based Channel Estimation Method for MIMO-OFDM Systems" Wireless Communications and Networking Conference 2007, IEEE, Mar. 11-15, 2007, pp. 159-163, ISSN 1525-3511.
Edfors, O. et al. "OFDM channel estimation by singular value decomposition" IEEE Transactions on Communications, vol. 46, No. 7, pp. 931-939, 1998.
Zhao, Y. et al. "A novel channel estimation method for OFDM mobile communication systems based on pilot signals and transform-domain processing" in Proceedings of the 47th IEEE Vehicular Technology Conference, 1997, vol. 3, pp. 2089-2093, Phoenix, AZ, USA, May 1997.

* cited by examiner

Primary Examiner — Khanh C Tran
(74) Attorney, Agent, or Firm — Potomac Patent Group PLLC

(57) ABSTRACT

A noisy frequency-domain channel estimate enhancer includes an over-sampler configured to transform the noisy frequency-domain channel estimate into a time-domain channel estimate that is virtually over-sampled by an integer factor m. The over-sampler is connected to a de-interleaver configured to divide the time-domain channel estimate into m de-interleaved sub-vectors. The de-interleaver is connected to a suppressor configured to suppress noisy taps from each de-interleaved sub-vectors to form m noise suppressed sub-vectors. The suppressor is connected to a selector configured to select a noise suppressed sub-vector associated with a highest signal-to-noise ratio. The selector is connected to a discrete Fourier transformer configured to transform the selected noise suppressed sub-vector into a noise suppressed preliminary frequency-domain channel estimate. The discrete Fourier transformer is connected to a phase-shifter configured to phase-adjust the taps of the noise suppressed preliminary frequency-domain channel estimate to form an enhanced frequency-domain channel estimate.

17 Claims, 11 Drawing Sheets

POWER SPECTRUM OF ORIGINAL CHANNEL ESTIMATE

POWER SPECTRUM OF ENHANCED CHANNEL ESTIMATE

ZERO-PADDED POWER SPECTRUM OF ORIGINAL CHANNEL ESTIMATE

POWER DISTRIBUTION OF IDFT OF
ZERO-PADDED ORIGINAL CHANNEL ESTIMATE

METHODS AND APPARATUS FOR ENHANCING CHANNEL ESTIMATION

TECHNICAL FIELD

The present invention relates generally to channel estimation in radio communication systems, and especially to enhancement of noisy frequency-domain channel estimates.

BACKGROUND

Orthogonal frequency-division multiplexing (OFDM) is an effective technique for combating multi-path fading and for high bit-rate transmission over mobile wireless channels. In OFDM system, the entire channel is divided into many narrow sub-channels, which are transmitted in parallel, thereby increasing the symbol length and reducing the inter-symbol interference (ISI). Channel estimation has been widely used to improve the performance of OFDM systems. It is crucial for diversity combination, coherent detection, and space-time coding. Various OFDM channel estimation schemes have been proposed in the literature:

The least square (LS) or the linear minimum mean square error (LMMSE) estimation is a frequency-domain based channel estimation method that has been proposed in reference [1].

Reference [2] introduced additional discrete Fourier transform (DFT) processing to obtain the frequency response of the LS-estimated channel. In contrast to the frequency-domain estimation method in [1], the transform domain estimation method uses the time-domain properties of channels.

Reference [3] describes a channel estimation method based on the discrete cosine transform instead of the DFT.

However, in many applications, such as orthogonal frequency division multiple access (OFDMA) system, only channel estimates of a part of the complete frequency response are available (since each user only accesses part of the available spectrum), and the estimate of the channel impulse response in the time domain cannot be obtained from the conventional DFT based method. After the inverse discrete Fourier transformation (IDFT) of the partial frequency response, the channel impulse response will leak to all taps in the time domain. Since the noise and leakage power are mixed up, the conventional DFT method will not only eliminate the noise, but also loose the useful but leaked channel power.

SUMMARY

A general object of the present invention is to enhance a noisy frequency-domain channel estimate.

This object is achieved in accordance with the attached claims.

A method of enhancing a noisy frequency-domain channel estimate in accordance with the present invention includes the following steps:

Transform the noisy frequency-domain channel estimate into a time-domain channel estimate that is virtually over-sampled by an integer factor m.

Divide the time-domain channel estimate into m de-interleaved sub-vectors.

Suppress noisy taps from each de-interleaved sub-vectors to form m noise suppressed sub-vectors.

Select a noise suppressed sub-vector associated with a highest signal-to-noise ratio.

Convert the selected noise suppressed sub-vector into a noise suppressed preliminary frequency-domain channel estimate.

Phase-adjust the taps of the noise suppressed preliminary frequency-domain channel estimate to form an enhanced frequency-domain channel estimate.

A noisy frequency-domain channel estimate enhancer in accordance with the present invention includes:

An over-sampler configured to transform the noisy frequency-domain channel estimate into a time-domain channel estimate that is virtually over-sampled by an integer factor m.

A de-interleaver configured to divide the time-domain channel estimate into m de-interleaved sub-vectors.

A suppressor configured to suppress noisy taps from each de-interleaved sub-vectors to form m noise suppressed sub-vectors.

A selector configured to select a noise suppressed sub-vector associated with a highest signal-to-noise ratio.

A discrete Fourier transformer (38) configured to transform the selected noise suppressed sub-vector into a noise suppressed preliminary frequency-domain channel estimate.

A phase-shifter configured to phase-adjust the taps of the noise suppressed preliminary frequency-domain channel estimate to form an enhanced frequency-domain channel estimate.

A radio communication system receiver in accordance with the present invention includes such a noisy frequency-domain channel estimate enhancer.

BRIEF DESCRIPTION OF THE DRAWINGS

The invention, together with further objects and advantages thereof, may best be understood by making reference to the following description taken together with the accompanying drawings, in which.

DETAILED DESCRIPTION

The following description will describe the principles of the present invention with reference to OFDMA, for example a long term evolution (LTE) system. However, the same principles may also be applied to other systems, such as WCDMA systems.

In the time domain most of the channel power is concentrated to the first few taps in the channel impulse response due to the correlation between subcarriers. However if only one or a small number of resource blocks (RBs) are allocated to the user, the time resolution will be low, and consequently the channel paths may not separate enough from each other. Furthermore some of the channel power may leak everywhere in the time domain, due to an improper sampling position. Thus, it is difficult to distinguish the channel power leakage from the noise if the sampling position is not optimal. The solution proposed below is based on virtual over-sampling to fine-tune the sampling position. It mimics the effect of an actual over-sampling by a phase rotation in the frequency domain.

Assume that a noisy frequency-domain channel estimate $$H_{in} = [H_0, H_1, \ldots, H_{N-2}, H_{N-1}] \quad (1)$$

of length N is available, for example as the result of the LS channel estimation method in the frequency domain, or of any other method resulting in a frequency-domain channel estimate.

Figure 1:
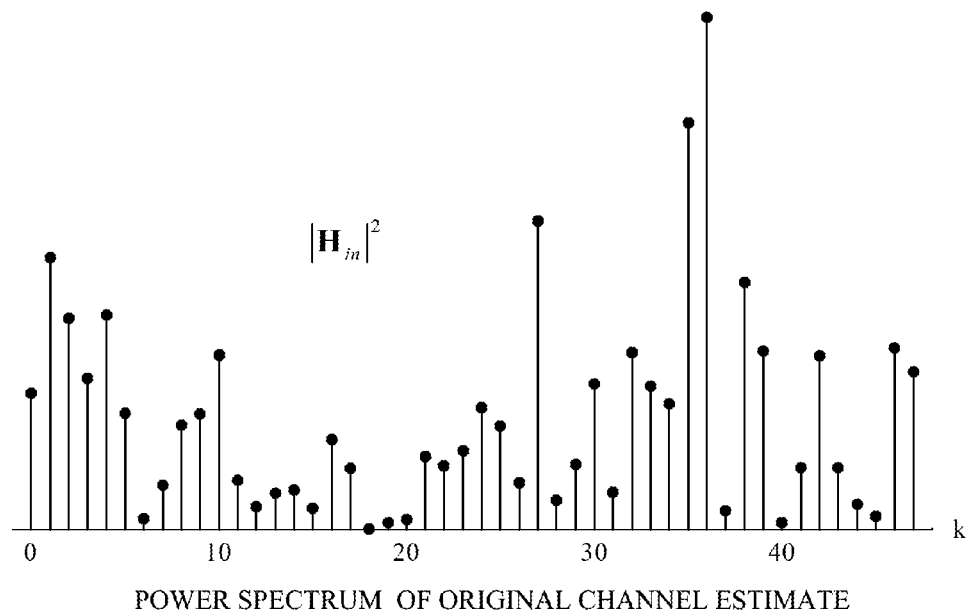
FIG. 1 is a diagram illustrating the power spectrum of an example of a noisy frequency-domain channel estimate.

FIG. 1 is a diagram illustrating the power spectrum of an example of such a noisy frequency-domain channel estimate $H_{in}$.

Figure 2:
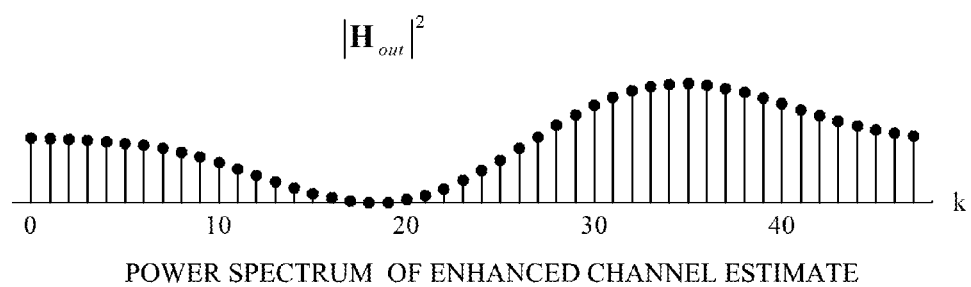
FIG. 2 is a diagram illustrating the power spectrum of the noisy frequency-domain channel estimate corresponding to FIG. 1 after it has been enhanced in accordance with an embodiment of the present invention.

FIG. 2 is a corresponding diagram illustrating the power spectrum of the noisy frequency-domain channel estimate in FIG. 1 after it has been enhanced in accordance with the present invention, which results in the enhanced frequency-domain channel estimate $H_{out}$. It is noted that the power spectrum of the channel estimate $H_{out}$ is much smoother than the power spectrum of the original channel estimate $H_{in}$.

Figure 3:
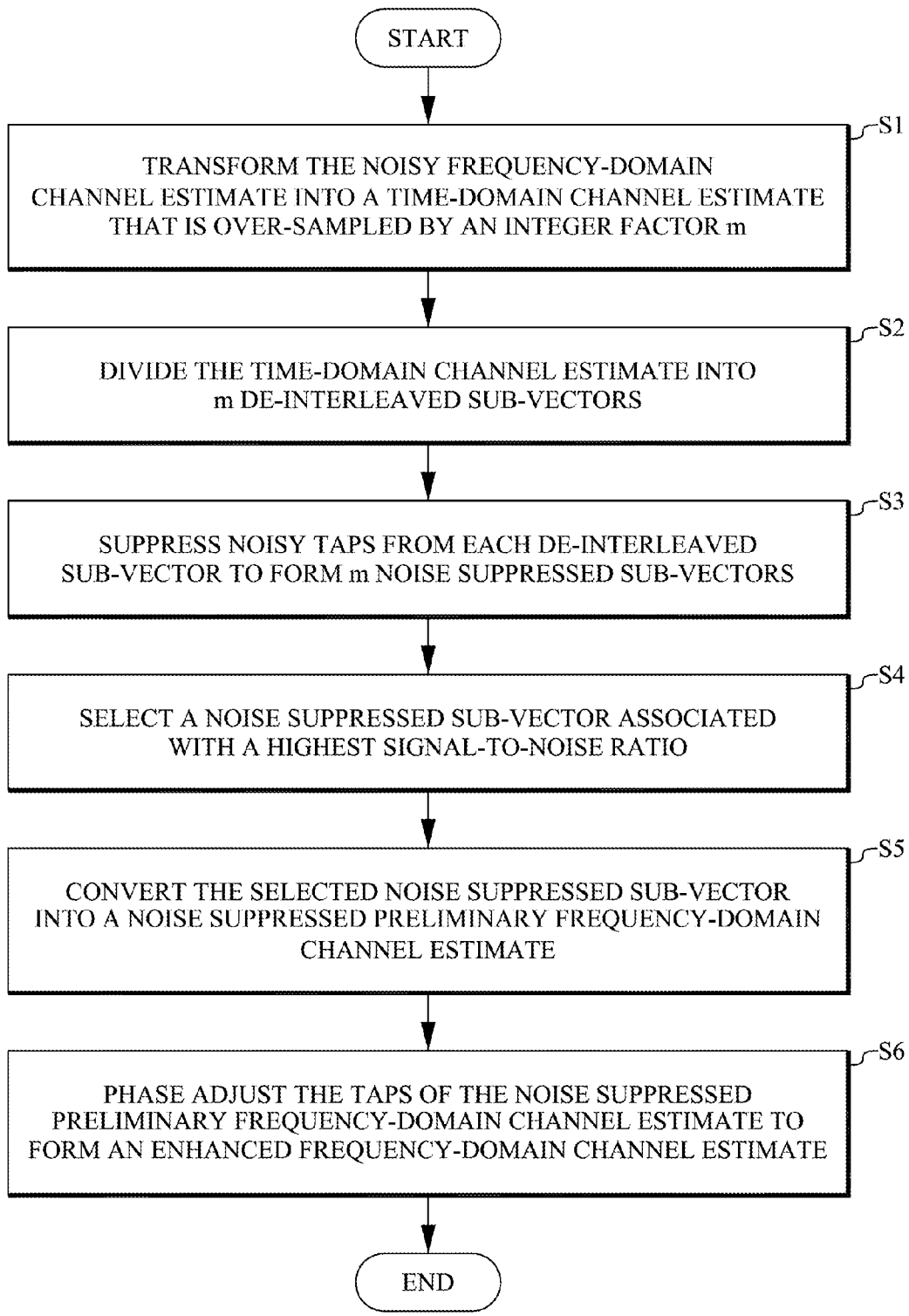
FIG. 3 is a flow chart illustrating the method in accordance with the present invention.

FIG. 3 is a flow chart illustrating the method in accordance with the present invention. In step S1 in FIG. 3 the noisy frequency-domain channel estimate $H_{in}$ is transformed into a time-domain channel estimate that is virtually over-sampled by an integer factor m, i.e. m=2, 3, 4, . . . . Step S2 divides the time-domain channel estimate into m de-interleaved sub-vectors. Step S3 suppresses noisy taps from each de-interleaved sub-vectors to form m noise suppressed sub-vectors. Step S4 selects a noise suppressed sub-vector associated with a highest signal-to-noise ratio. Step S5 converts the selected noise suppressed sub-vector into a noise suppressed preliminary frequency-domain channel estimate. Step S6 phase-adjusts the taps of the noise suppressed preliminary frequency-domain channel estimate to form an enhanced frequency-domain channel estimate $H_{out}$.

Figure 4:
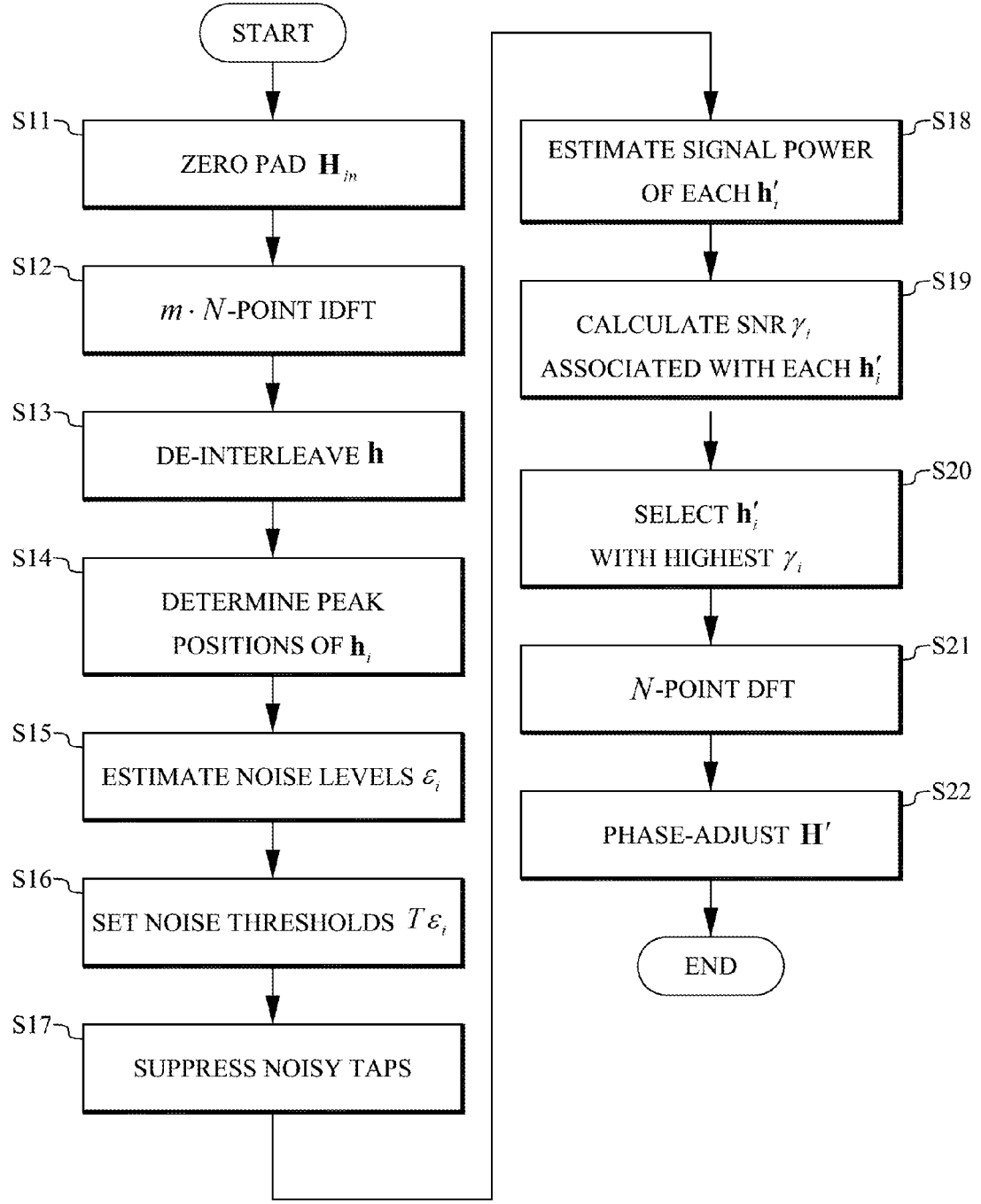
FIG. 4 is a flow chart illustrating an embodiment of the method in accordance with the present invention.
Figure 5:
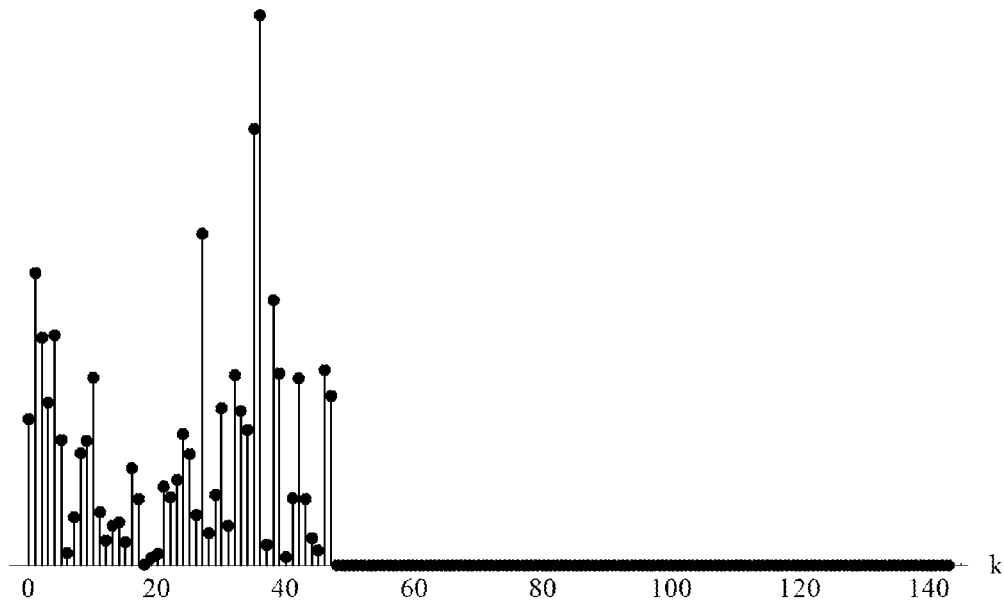
FIG. 5 is a diagram illustrating the power spectrum of the noisy frequency-domain channel estimate corresponding to FIG. 1 after zero-padding.
Figure 6:
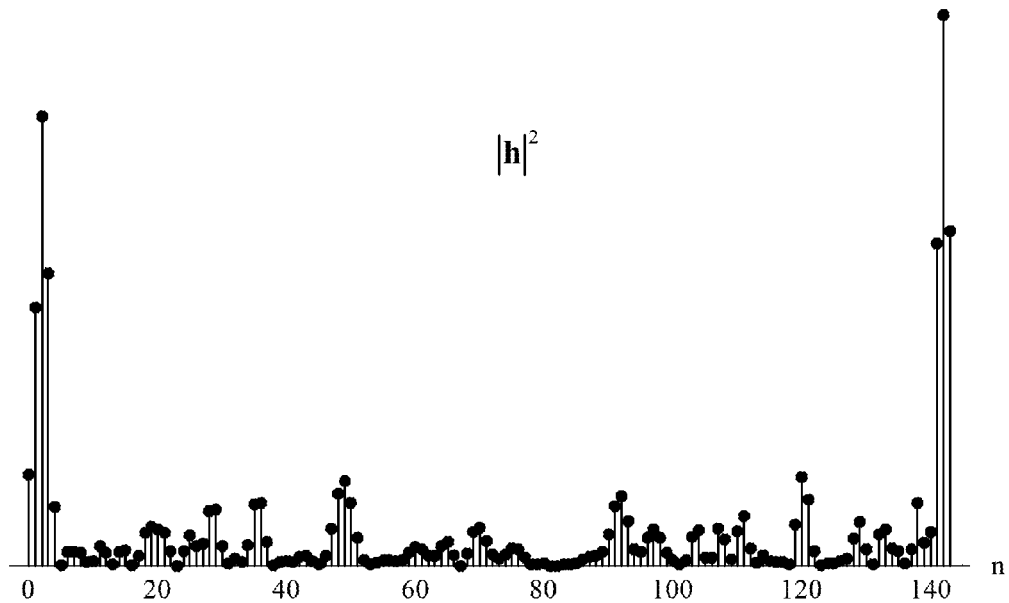
FIG. 6 a diagram illustrating the power distribution of the IDFT of the zero-padded channel estimate corresponding to FIG. 5.

FIG. 4 is a flow chart illustrating an embodiment of the method in accordance with the present invention. In step S11 the original channel estimate $H_{in}$ is zero-padded by (m−1)N zeros, as illustrated in FIG. 5 (m=3 is assumed in the example). Step S12 then performs an m·N-point IDFT on the zero-padded channel estimate in accordance with:

$$h = [h_0, h_1, \ldots, h_{mN-2}, h_{mN-1}] = m \cdot IDFT[H_{in}, \text{zeros}(1, (m-1) \cdot N)] \quad (2)$$

where the multiplication by over-sampling rate m is to maintain the same power in the time domain after zero-padding (this is optional, a corresponding compensation could be performed at a later stage in the process, for example at the last step S22 described below). FIG. 6 illustrates the power distribution of the IDFT h of the zero-padded original channel estimate $H_{in}$.

The described steps S11+S12 illustrate one possible implementation of step S1 in FIG. 3. Another possibility is to perform an N-point IDFT on the noisy frequency-domain channel estimate $H_{in}$ to form a noisy time-domain channel estimate, to pad m−1 zeros after each sample of the noisy time-domain channel estimate, and to lowpass filter the zero-padded noisy time-domain channel estimate.

Step S13 in FIG. 4 de-interleaves the time-domain channel estimate h into m de-interleaved sub-vectors $h_i$ in accordance with:

$$h_i = [h_{0,i}, h_{1,i}, \ldots, h_{n,i}, \ldots, h_{N-1,i}], i = -\max\left(\left\lceil \frac{m}{2} \right\rceil - 1, 0\right), \ldots, \left\lfloor \frac{m}{2} \right\rfloor \quad (3)$$

where $h_{n,i} = h_{mod(i+nm,mN)}$, n=0, 1, . . . , N−1,

⌈ ⌉ is the ceiling function,

⌊ ⌋ is the floor function.

Figure 7A:
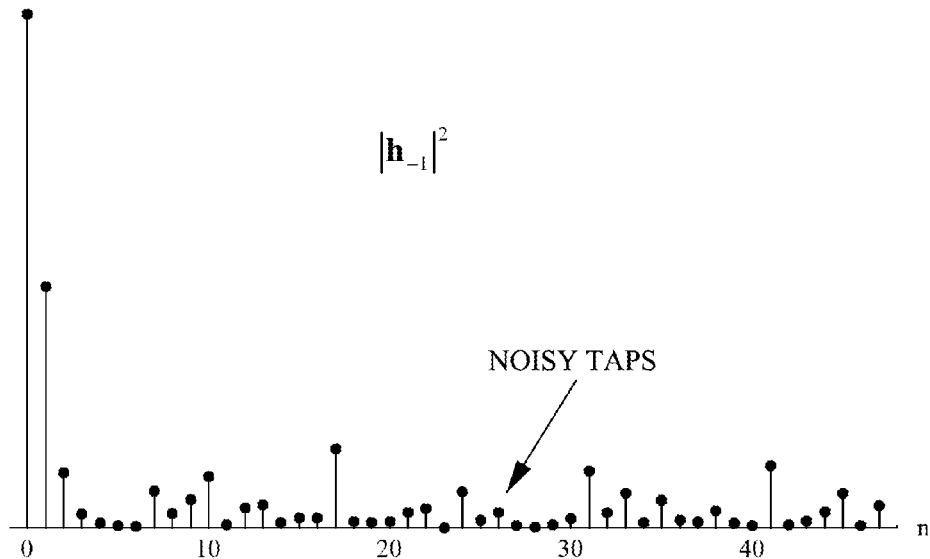
FIG. 7a-c are diagrams illustrating the power distribution of de-interleaved sub-vectors obtained from the time-domain estimate corresponding to FIG. 6.
Figure 7B:
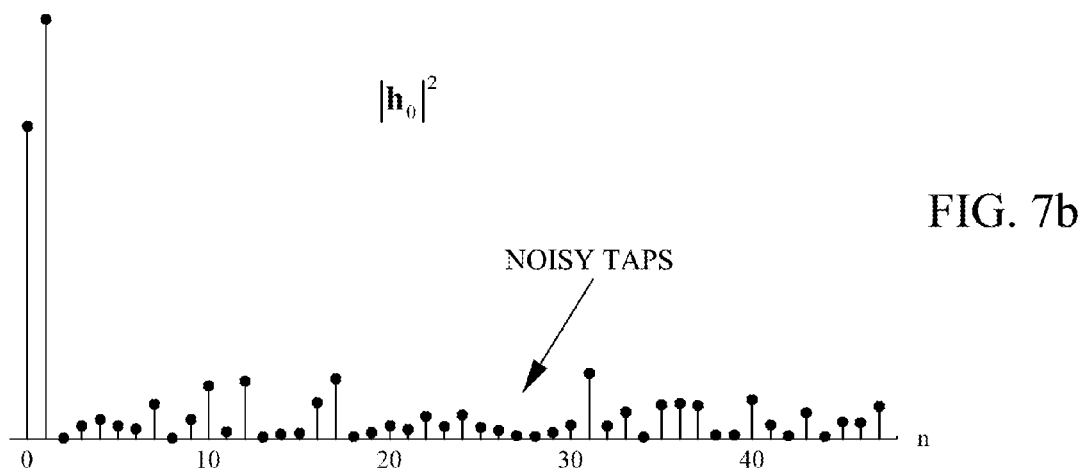
Figure 7C:
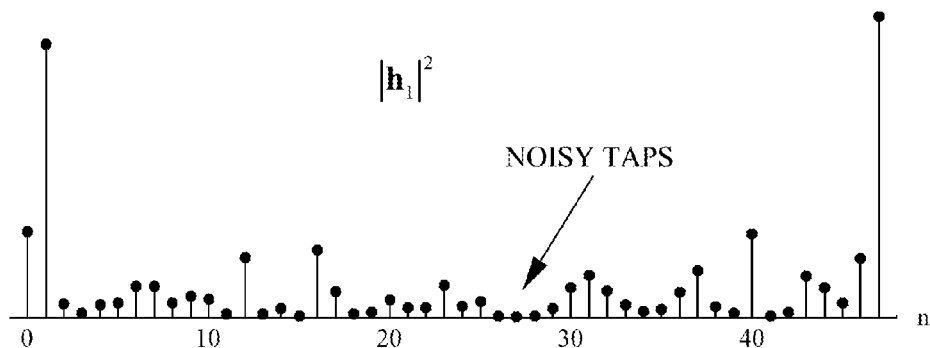

The power distributions of the resulting sub-vectors $h_{-1}$, $h_0$, $h_1$ are illustrated in FIG. 7a-c.

The sub-vectors $h_i$ may be considered as cyclically shifted versions of $h_0$, which corresponds to the N-point IDFT of $H_{in}$, by a fractional shift of i/m, i.e.

$$h_i = h_0 * \delta\left(n + \frac{i}{m}\right)$$

where * denotes cyclic convolution.

Step S14 determines the position $n_{max,i}$ of the peak power tap of each sub-vector $h_i$. Preferably the peak search is limited to n=[0,L] and n=[N−L,N−1], assuming that the system delay is within the length of the cyclic prefix (CP). Here L is an assumed channel length that may be the equivalent length of the CP. In the example L=2 has been used.

Step S15 estimates the noise level $\epsilon_i$ of each sub-vector $h_i$ in accordance with:

$$\varepsilon_i = \underset{L < mod(n - n_{max,i}, N) < N - L}{\text{mean}} (|h_{n,i}|^2) \quad (4)$$

i.e. it determines the mean power of the taps outside of the peak region.

In (4) $\epsilon_i$ is the power of the noise and the leakage. Thus, with more leakage, $\epsilon_i$ will be larger and the estimated channel power will be smaller.

If uplink multi-user multiple-input multiple-output (MU-MIMO) is enabled, then the above noise positions L<mod(n−$n_{max,i}$,N)<N−L in (4) should be adjusted accordingly to remove the positions occupied by cyclically shifted reference-signal sequences due to MU-MIMO.

Step S16 sets a threshold for each value of i to pick up the valid channel paths. The threshold is set to $T\epsilon_i$, where T is a constant, which can be obtained from simulations to achieve the best performance. As a typical example, T=2, but generally T has a value in the interval [1.5, 2.5].

After the thresholds $T\epsilon_i$ have been set, step S17 suppresses noisy taps in $h_i$ in accordance with:

$$h'_{n,i} = \begin{cases} h_{n_{max},i}, & n = n_{max,i} \\ h_{n,i}, & |h_{n,i}|^2 \geq T\varepsilon_i \ 0 < \mod(n - n_{max,i}, N) \leq L \text{ or} \\ & N - L \leq \mod(n - n_{max,i}, N) \leq N - 1 \\ 0, & \text{else} \end{cases} \quad (5)$$

Figure 8A:
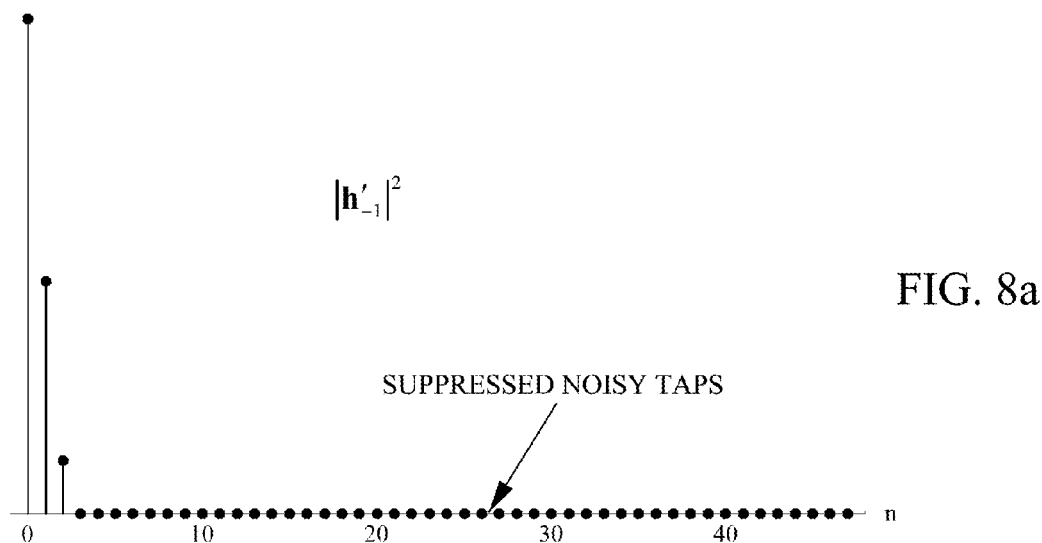
FIG. 8a-c are diagrams illustrating the power distribution of noise suppressed de-interleaved sub-vectors corresponding to FIG. 7a-c.
Figure 8B:
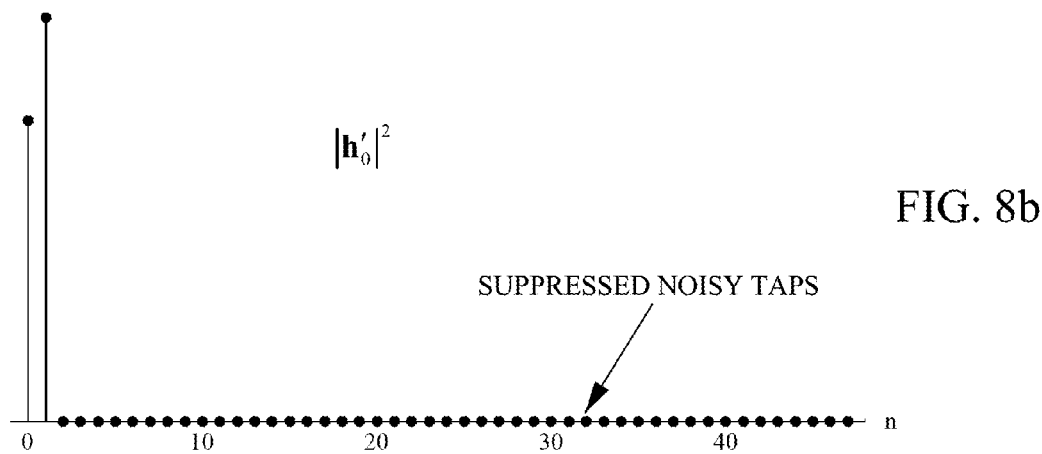
Figure 8C:
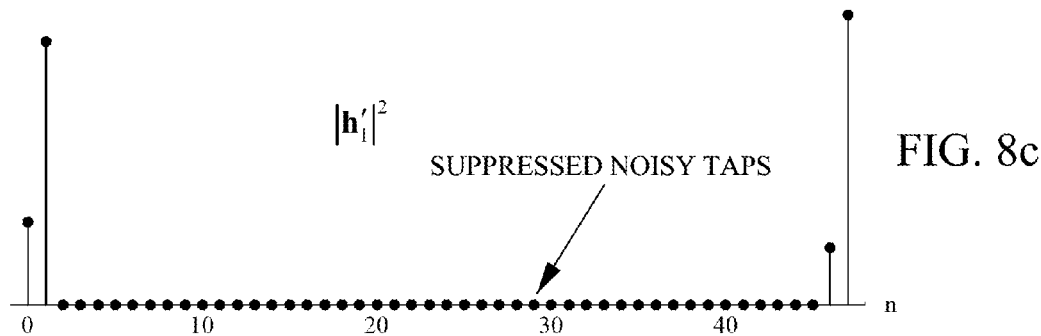

This suppresses taps with a power that falls below the respective noise threshold $T\epsilon_i$ and are positioned within the channel length L (in a cyclic sense, where tap N−1 is adjacent to tap 0) from the determined respective position $n_{max,i}$ as well as taps that are not positioned within the channel length L from the determined respective position $n_{max,i}$, while leaving the peak power tap unchanged. The power distribution of the obtained sub-vectors $h'_{-1}$, $h'_0$, $h'_1$ are illustrated in FIG. 8a-c. It is noted that only sufficiently strong taps around the respective peak power taps have survived the suppression.

Step S18 estimates the signal power $P'_i$ of each sub-vector $h'_i$ as:

$$P'_i = \sum_{n=0}^{N-1} |h'_{n,i}|^2$$

Step S19 calculates the signal-to-noise ratio (SNR) for each sub-vector $h'_i$ as:

$$\gamma_i = \frac{P'_i}{\varepsilon_i} \quad (6)$$

Step S20 selects a sub-vector $h'_{i0}$ having the highest SNR $\gamma_i$, i.e.

$$i_0 = \underset{-\max(\lceil \frac{m}{2} \rceil - 1, 0) \leq i \leq \lfloor \frac{m}{2} \rfloor}{\arg\max} (\gamma_i) \quad (7)$$

Step S21 performs an N-point DFT on the selected sub-vector $h'_{i0}$ (in the example i0=−1) in accordance with:

$$H' = DFT[h'_{i0}] = [H'_0, H'_1, \ldots, H'_{N-1}] \quad (8)$$

Since $h'_{i0}$ corresponds to a cyclically shifted version of $h_0$ by a factional shift of i0/m, a phase rotation in the frequency domain is added to the taps of H' to compensate for this timing shift. Thus, step S22 phase-adjusts the taps of H' in accordance with:

$$H_{out,k} = H'_k \cdot \exp\left(-j \cdot 2\pi \cdot \frac{i0}{m} \cdot \frac{k}{N}\right) \quad (9)$$

The power spectrum of this enhanced frequency-domain channel estimate $H_{out}$ is illustrated in FIG. 2.

The enhanced channel estimate $H_{out}$ will be used for data demodulation and other purposes requiring a channel estimate. The estimated system delay is $n_{max,i0}+i0/m$.

Regarding the choice of (virtual) over-sampling rate m, a high over-sampling rate is always good for the system performance, but it increases the computation complexity. Thus, a trade-off between performance and cost is preferable.

A narrow user bandwidth and high SNR operation level will demand a high over-sampling rate to minimize the signal-to-interference-and-noise ratio (SINR) degradation caused by channel power leakage. Typically higher order modulation and high coding rate require a high SNR, and the SNR per antenna in the single antenna case, for example a dedicated in-building-system, is higher than that in the case of multiple receiving antennas.

For a given SNR and user bandwidth (corresponding to the value of N), the SINR degradation due to channel power leakage for an over-sampling rate of m may be calculated as:

$$\frac{SINR}{SNR} = \frac{1 - \sum_{n=L+1}^{N-(L+1)} |g_n|^2}{SNR \cdot \sum_{n=L+1}^{N-(L+1)} |g_n|^2 + 1}$$

where $$g = [g_0, g_1, \ldots, g_n, \ldots, g_{N-2}, g_{N-1}] = IDFT\left[\exp\left(j \cdot 2\pi \cdot \frac{0.5}{m} \cdot \frac{n}{N}\right)\right]$$

The above calculation may be performed for different over-sampling rates m. The lowest over-sampling rate that satisfies the SINR degradation requirement, i.e. a degradation not higher than a predefined value, is selected to be the virtual over-sampling rate m for the given SNR and user bandwidth. A look-up table of optimal over-sampling rates could be constructed accordingly with SNR and user bandwidth (represented by N) as indices into the table.

Figure 9:
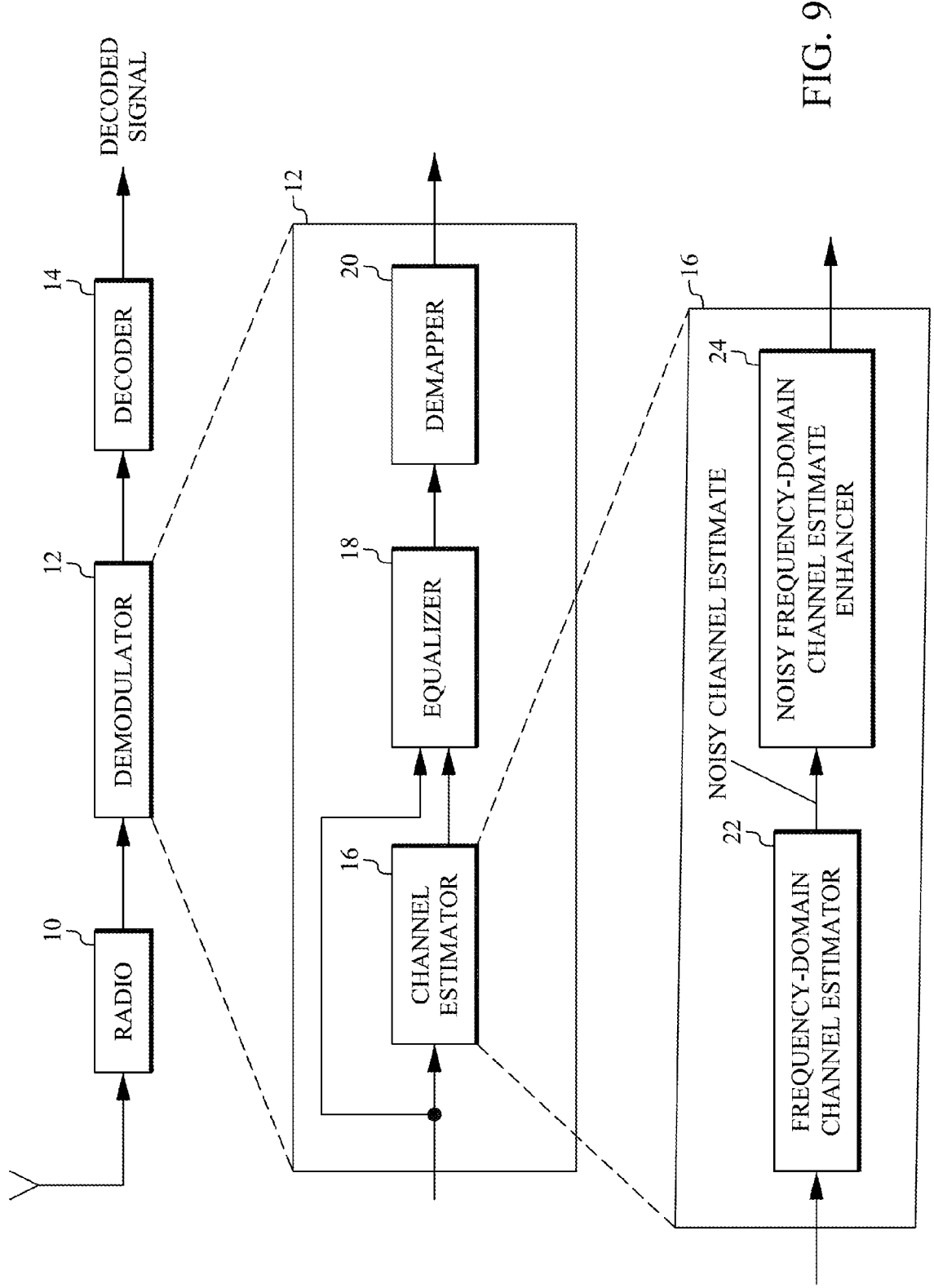
FIG. 9 is a block diagram of a radio receiver including a noisy frequency-domain channel estimate enhancer in accordance with the present invention.

FIG. 9 is a block diagram illustrating a radio receiver, in the example an LTE receiver, including a noisy frequency-domain channel estimate enhancer in accordance with the present invention. An antenna receiving uplink signals is connected to a radio 10 that transforms the signals down to baseband and forwards them to a demodulator 12. Demodulator 12 transforms the received symbols into modulated data symbols, which are demapped into bit soft values. After demapping demodulator 12 forwards the bit soft values to a decoder 14, which decodes them. Demodulator 12 includes a channel estimator 16 connected to an equalizer 18. The equalized modulated data symbols from equalizer 18 are forwarded to a demapper 20, which demaps them into bit soft values. Channel estimator 16 includes a frequency-domain channel estimator 22 and a noisy frequency-domain channel estimate enhancer 24 in accordance with the present invention. Estimator 22 generates a noisy frequency-domain channel estimate, which is enhanced by enhancer 24 in accordance with the principles described above.

Figure 10:
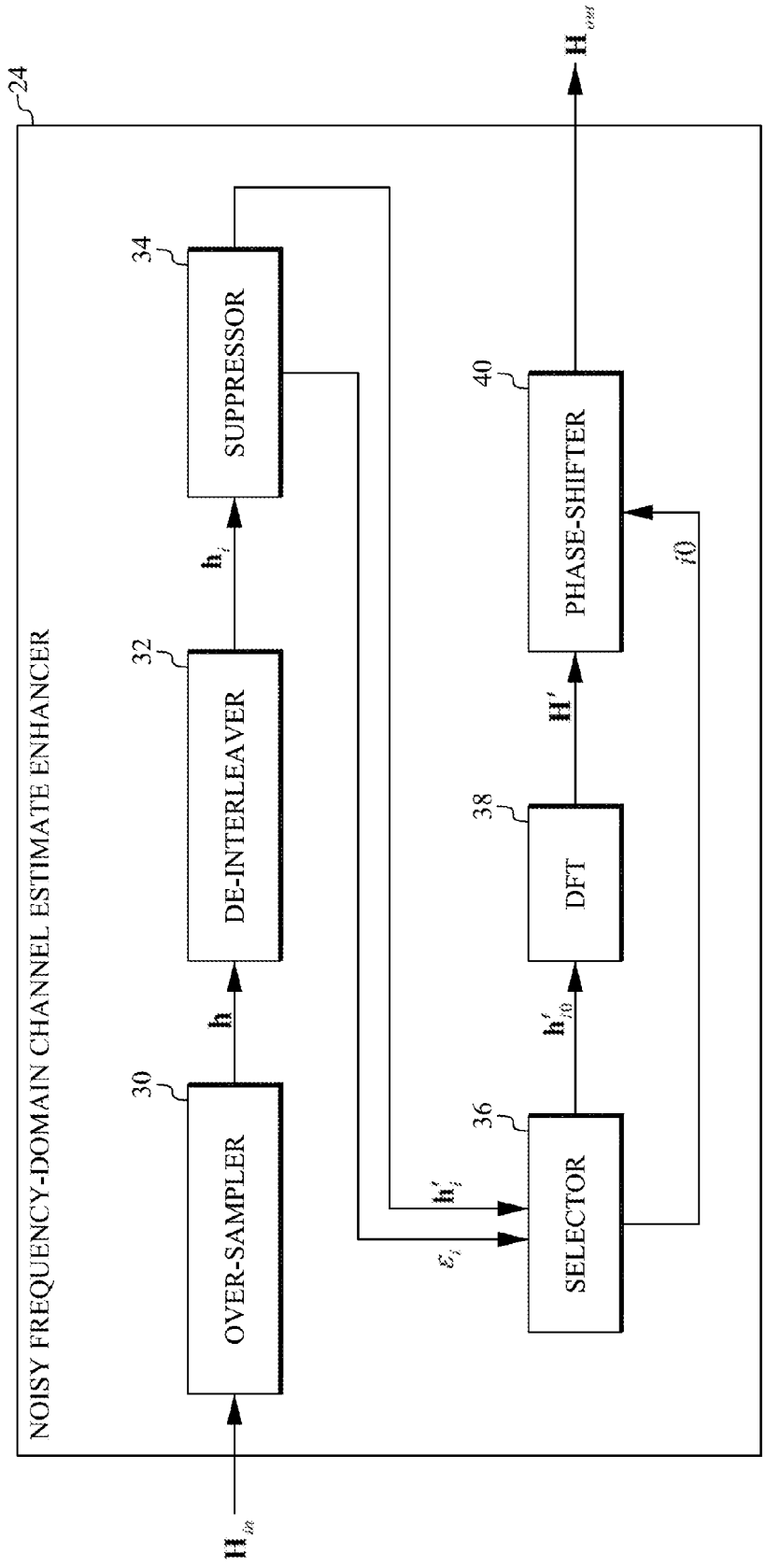
FIG. 10 is a block diagram illustrating an embodiment of the enhancer in accordance with the present invention.

FIG. 10 is a block diagram illustrating an embodiment of the noisy frequency-domain channel estimate enhancer 24 in accordance with the present invention. The enhancer 24 includes an over-sampler 30 configured to transform the noisy frequency-domain channel estimate $H_{in}$ into a time-domain channel estimate h that is virtually over-sampled by an integer factor m. The over-sampler 30 is connected to a de-interleaver 32 configured to divide the time-domain channel estimate h into m de-interleaved sub-vectors $h_i$. Deinterleaver 32 is connected to a suppressor 34 configured to suppress noisy taps from each de-interleaved sub-vectors $h_i$ to form m noise suppressed sub-vectors $h'_i$. Suppressor 34 is connected to a selector 36 configured to select a noise suppressed sub-vector $h'_{i0}$ associated with a highest signal-to-noise ratio $\gamma_i$. Selector 36 is connected to a discrete Fourier transformer 38 configured to transform the selected noise suppressed sub-vector $h'_{i0}$ into a noise suppressed preliminary frequency-domain channel estimate H'. Discrete Fourier transformer 38 is connected to a phase-shifter 40 configured to phase-adjust the taps of the noise suppressed preliminary frequency-domain channel estimate H' to form an enhanced frequency-domain channel estimate $H_{out}$. In the illustrated embodiment the noise levels $\epsilon_i$ used by selector 36 are obtained from suppressor 34, which has already determined them to set the thresholds $T\epsilon_i$. Selector 36 also forwards the selected index i0 to phase-shifter 40.

Figure 11:
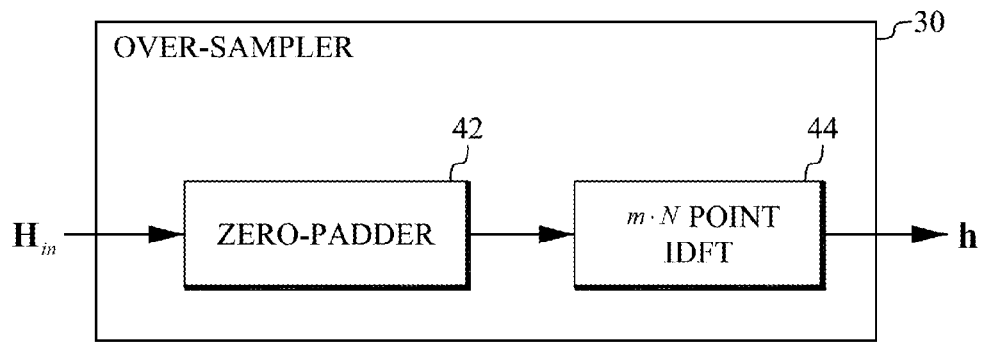
FIG. 11 is a block diagram of an embodiment of an over-sampler that may be used in the noisy frequency-domain channel estimate enhancer in accordance with the present invention.

FIG. 11 is a block diagram of an embodiment of an over-sampler 30 that may be used in the noisy frequency-domain channel estimate enhancer in accordance with the present invention. This embodiment of the over-sampler 30 includes a zero-padder 42 configured to zero-pad the noisy frequency-domain channel estimate $H_{in}$ with (m−1)·N zeros. The zero-padder 42 is connected to an IDFT 44 configured to perform an m·N point inverse discrete Fourier transformation on the zero-padded noisy frequency-domain channel estimate $H_{in}$.

Figure 12:
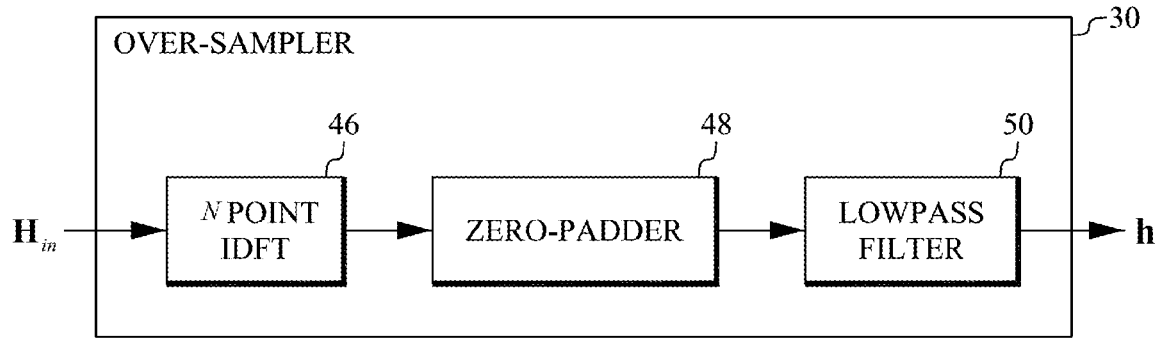
FIG. 12 is a block diagram of another embodiment of an over-sampler that may be used in the noisy frequency-domain channel estimate enhancer in accordance with the present invention.

FIG. 12 is a block diagram of another embodiment of an over-sampler 30 that may be used in the noisy frequency-domain channel estimate enhancer in accordance with the present invention. This embodiment of the over-sampler 30 includes an IDFT 46 configured to perform an N-point inverse discrete Fourier transformation on the noisy frequency-domain channel estimate $H_{in}$. The IDFT 46 is connected to a zero-padder 48 configured to pad m−1 zeros after each sample of the noisy time-domain channel estimate. The zero-padder 48 is connected to a lowpass filter 50 configured to lowpass filter the zero-padded noisy time-domain channel estimate.

Figure 13:
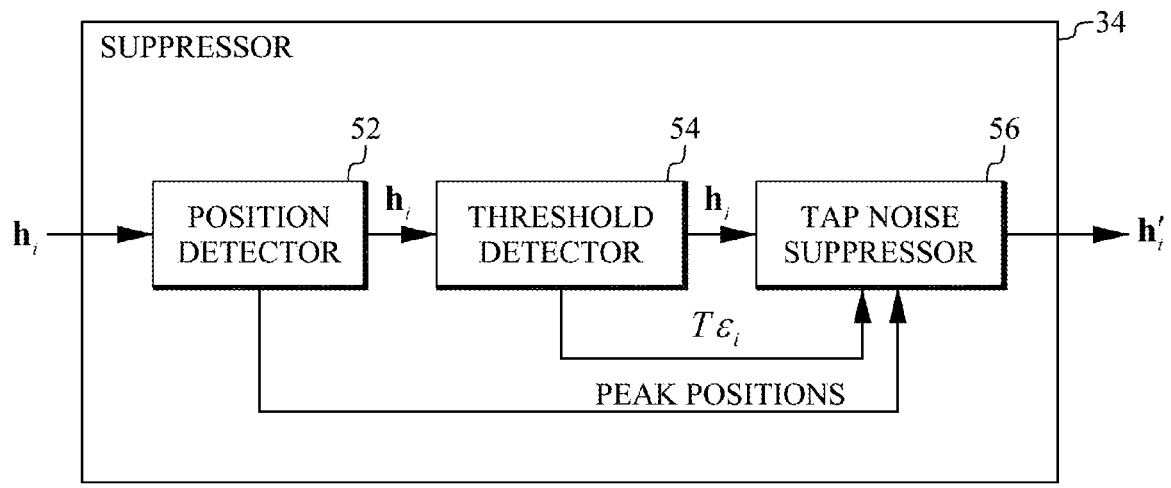
FIG. 13 is a block diagram of an embodiment of a suppressor that may be used in the noisy frequency-domain channel estimate enhancer in accordance with the present invention.

FIG. 13 is a block diagram of an embodiment of a suppressor 34 that may be used in the noisy frequency-domain channel estimate enhancer in accordance with the present invention. This embodiment of suppressor 34 includes a position detector 52 configured to determine a respective position of a peak power tap for each interleaved sub-vector $h_i$. Position detector 52 is connected to a threshold detector 54 configured to detect a respective noise threshold $T\epsilon_i$ for each sub-vector $h_i$. Threshold detector 54 is connected to a tap noise suppressor 56 configured to suppress taps with a power that falls below the respective noise threshold $T\epsilon_i$ and are positioned within a predetermined channel length L (in a cyclic sense, where tap N−1 is adjacent to tap 0) from the determined respective position as well as taps that are not positioned within the channel length L from the determined respective position, while leaving the peak power tap unchanged.

Figure 14:
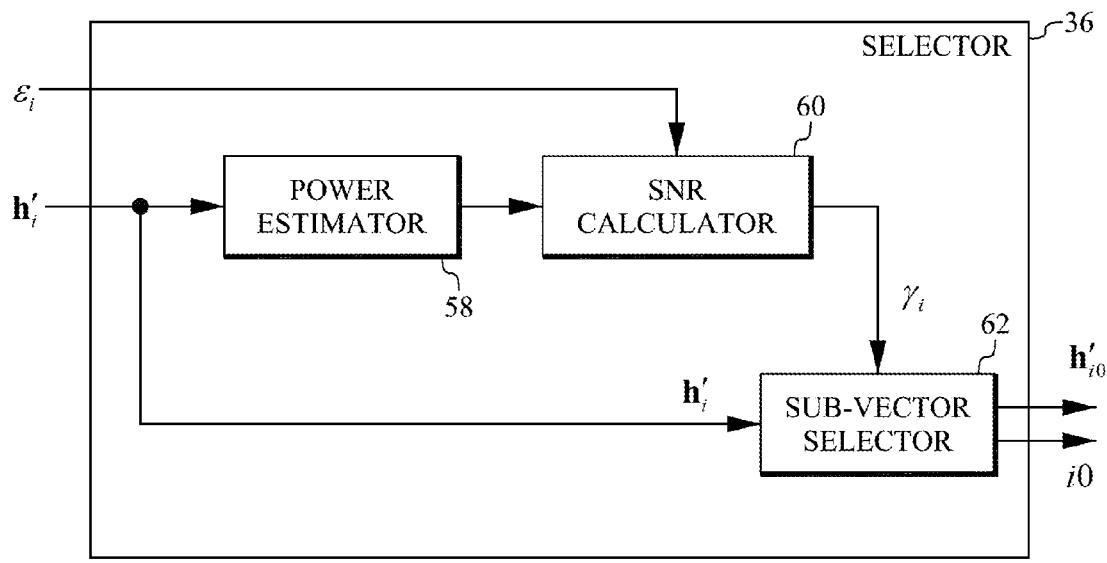
FIG. 14 is a block diagram of an embodiment of a selector that may be used in the noisy frequency-domain channel estimate enhancer in accordance with the present invention.

FIG. 14 is a block diagram of an embodiment of a selector 36 that may be used in the noisy frequency-domain channel estimate enhancer in accordance with the present invention. This embodiment of selector 36 includes a power estimator 58 configured to estimate a respective total power measure for each noise suppressed sub-vector $h'_i$. Power estimator 58 is connected to an SNR calculator 60 configured to determine an SNR $\gamma_i$ associated with each noise suppressed sub-vector $h'_i$ based on the corresponding estimated signal power measure $P'_i$ and a corresponding estimated noise level measure $\epsilon_i$. SNR calculator 60 is connected to a sub-vector selector 62 configured to select a noise suppressed sub-vector $h'_{i0}$ associated with a highest calculated SNR $\gamma_i$.

The functionality of the various blocks and method steps described above is typically based on one or several micro processors or micro/signal processor combinations running corresponding software. The DFT and IDFT are typically performed by a fast Fourier transform (FFT) and an inverse fast Fourier transform (IFFT), respectively.

In order to test the virtual over-sampling based enhancement method of the present invention, channel estimates with and without virtual over sampling have been compared by means of simulations. The simulation parameters were as follows:

Simulation Parameter Configurations

| Simulation parameters | Values |
| --- | --- |
| Standard | 3GPP LTE Release 8 |
| Physical channel | PUSCH |
| System bandwidth | 20 MHz |
| Doppler frequency | 5 Hz |
| Number of sub-carriers per RB | 12 |
| Channel coding & modulation | 1/3 turbo coding, QPSK |
| Number of antennas at the eNodeB | 2 |
| First path delay of channel | 0.52 us |

Figure 15:
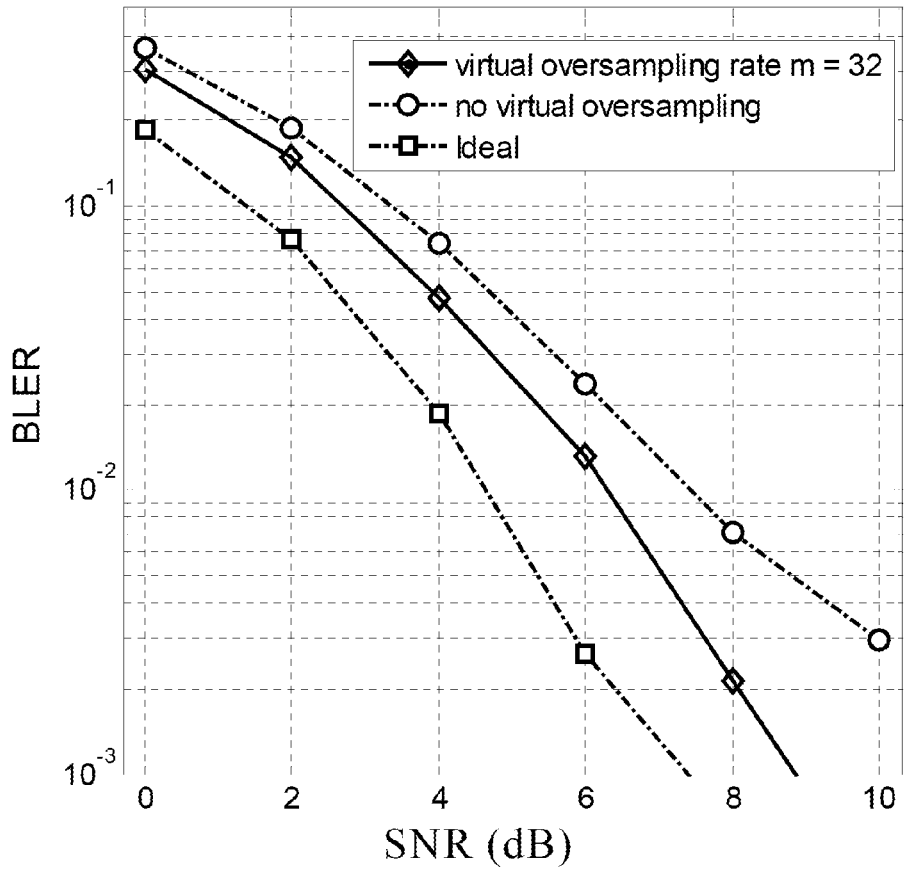
FIG. 15 is a diagram illustrating the improvement obtained by the present invention.

FIG. 15 compares LS channel estimation with and without virtual over-sampling in accordance with the present invention. The simulation is based on the 3GPP ETU model and use of a 1 RB channel and 2 antennas. For a given block error rate (BLER) of, for example, 0.01 channel estimation with virtual over-sampling can tolerate an SNR that is more than 1 dB lower than channel estimation without virtual over-sampling. From FIG. 15 it can also be seen that, at higher SNR, the performance without virtual over-sampling approaches a BLER floor due to the inaccurate channel estimation, while the performance with virtual over-sampling does not. The ideal performance with ideal channel estimation and ideal noise & interference power estimation is also shown as a reference.

Figure 16:
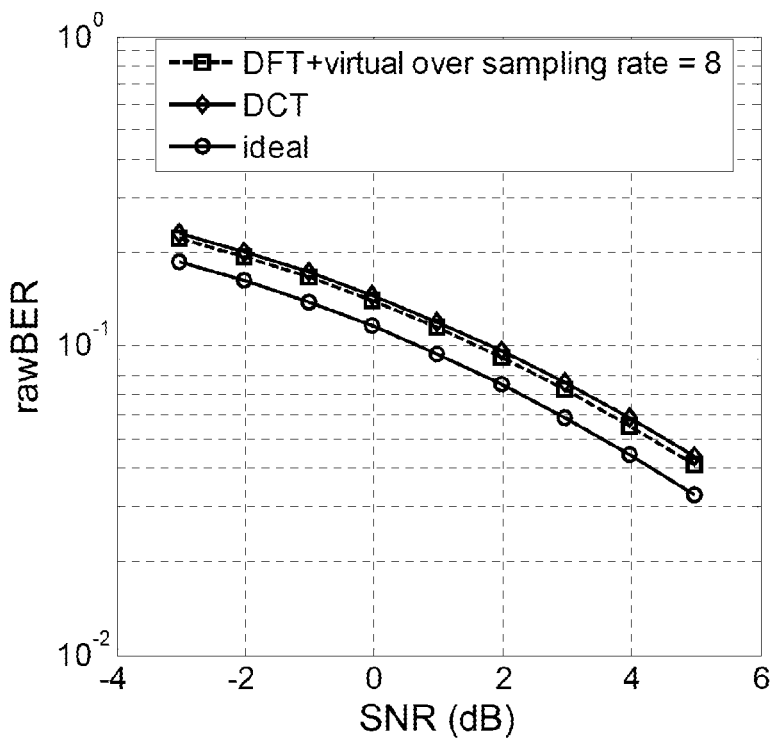
FIG. 16 is a diagram illustrating another aspect of the improvement obtained by the present invention.

FIG. 16 compares the raw bit error rates (rawBER) for non-ideal channel estimates (based on the 3GPP EVA5 model) obtained by the DCT method, see [3], to channel estimates enhanced in accordance with the present invention to. The simulation is based on the use of a 1 RB channel and 2 antennas. The ideal performance with ideal channel estimation and ideal noise and interference power estimation is also shown as a reference.

Figure 17:
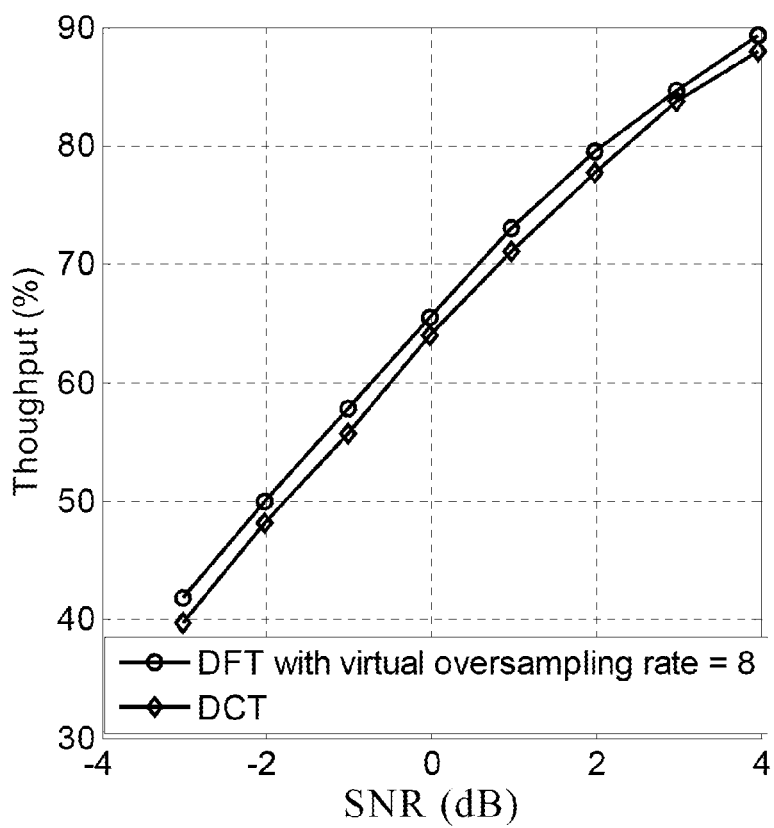
FIG. 17 is a diagram illustrating still another aspect of the improvement obtained by the present invention.

FIG. 17 compares the throughput for non-ideal channel estimates (based on the 3GPP EVA5 model) obtained by the DCT method, see [3], to channel estimates enhanced in accordance with the present invention to. The simulation is based on the use of a 1 RB channel, 2 antennas and a maximum retransmission number=4.

From FIGS. 16 and 17 it can be seen that the method in accordance with the present invention is better than DCT method described in [3], and the performance will be even better with higher virtual over sampling rate m. Furthermore, the time domain result of the method in accordance with the present invention can be directly used to do the timing advance estimation (via i0), while the time domain result of the DCT algorithm cannot.

The introduction of virtual over-sampling in noisy frequency domain (DFT based) channel estimation significantly reduces the impact of noise and channel power leakage. As a result the SNR of the channel estimation as well as the performance of the system is improved.

When one or a small number of RBs are allocated, the over-sampling will greatly improve the channel estimation performance compared with the DFT only channel estimation described in [2].

It will be understood by those skilled in the art that various modifications and changes may be made to the present invention without departure from the scope thereof, which is defined by the appended claims.

ABBREVIATIONS

3GPP Third Generation Partnership Project
rawBER raw Bit Error Rate
BLER BLock Error Rate
CP Cyclic Prefix
DCT Discrete Cosine Transform(ation)
DFT Discrete Fourier Transform(ation)
ETU Extended Typical Urban model
EVA5 Extended Vehicular A model
FFT Fast Fourier Transform(ation)
IDFT Inverse Discrete Fourier Transform(ation)
IFFT Inverse Fast Fourier Transform(ation)
ISI Inter-Symbol Interference
LMMSE Linear Minimum Mean Square Error
LS Least Square
LTE Long Term Evolution
MU-MIMO Multi-User Multiple-Input Multiple-Output
OFDM Orthogonal Frequency-Division Multiplexing
OFDMA Orthogonal Frequency-Division Multiple Access
RB Resource block
SINR Signal-to-Interference-and-Noise Ratio
SNR Signal-to-Noise Ratio

REFERENCES

[1] O. Edfors, M. Sandell, J.-J. van de Beek, S. K. Wilson, and P. O. Börjesson, "OFDM channel estimation by singular value decomposition," IEEE Transactions on Communications, vol. 46, no. 7, pp. 931-939, 1998.
[2] Y. Zhao and A. Huang, "A novel channel estimation method for OFDM mobile communication systems based on pilot signals and transform-domain processing," in Proceedings of the 47th IEEE Vehicular Technology conference (VTC '97), vol. 3, pp. 2089-2093, Phoenix, Ariz., USA, May 1997.
[3] Shaopeng Feng, Nan Hu, Bin Yang, Weiling Wu, 'DCT-Based Channel Estimation Method for MIMO-OFDM Systems,' Wireless Communications & Networking Conference, 2007 IEEE.

What is claimed is:

1. A method of enhancing a noisy frequency-domain channel estimate, comprising:
transforming, in a receiver, the noisy frequency-domain channel estimate into a time-domain channel estimate that is virtually over-sampled by an integer factor m;
dividing the time-domain channel estimate into m de-interleaved sub-vectors;
suppressing noisy taps from each de-interleaved sub-vectors to form m noise suppressed sub-vectors;
selecting a noise suppressed sub-vector associated with a highest signal-to-noise ratio;
converting the selected noise suppressed sub-vector into a noise suppressed preliminary frequency-domain channel estimate; and
phase-adjusting the taps of the noise suppressed preliminary frequency-domain channel estimate to form an enhanced frequency-domain channel estimate.

2. The method of claim 1, wherein suppressing noisy taps comprises:
determining a respective position of a peak power tap for each interleaved sub-vector;
setting a respective noise threshold for each sub-vector;
suppressing taps with a power that falls below the respective noise threshold and are positioned within a predetermined channel length from the determined respective position as well as taps that are not positioned within the channel length from the determined respective position, while leaving the peak power tap unchanged.

3. The method of claim 1, wherein phase-adjusting the taps includes phase-shifting taps $H'_k$ of the noise suppressed preliminary frequency-domain channel estimate in accordance with:

$$H'_k \cdot \exp\left(-j \cdot 2\pi \cdot \frac{i0}{m} \cdot \frac{k}{N}\right)$$

where
k is a tap index,
N is a total number of taps in the noisy frequency-domain channel estimate, and
i0 is a peak position in the noise suppressed preliminary frequency-domain channel estimate.

4. The method of claim 1, wherein selecting the noise-suppressed sub-vector comprises:
estimating a respective noise level measure for each de-interleaved sub-vector;
estimating a respective total power measure for each noise suppressed sub-vector;
calculating a signal-to-noise ratio associated with each noise suppressed sub-vector based on the corresponding estimated total power measure and the corresponding estimated noise level measure; and
selecting a noise suppressed sub-vector associated with a highest calculated signal-to-noise ratio.

5. The method of claim 1, wherein dividing the time-domain channel estimate includes forming m de-interleaved sub-vectors $h_i$ in accordance with:

$$h_i = [h_{0,i}, h_{1,i}, \ldots, h_{n,i}, \ldots, h_{N-1,i}],$$

$$i = -\max\left(\left\lceil\frac{m}{2}\right\rceil - 1, 0\right), \ldots, \left\lfloor\frac{m}{2}\right\rfloor$$

where
$h_{n,i} = h_{mod(i+nm,mN)}$, n=0, 1, ..., N−1,
N is a total number of taps in the frequency-domain channel estimate,
⌈ ⌉ is a ceiling function, and
⌊ ⌋ is a floor function.

6. The method of claim 1, wherein transforming the noisy frequency-domain channel estimate comprises:
zero-padding the noisy frequency-domain channel estimate with (m−1)·N zeros, where N is a total number of taps in the noisy frequency-domain channel estimate; and performing an m·N point inverse discrete Fourier transformation on the zero-padded noisy frequency-domain channel estimate.

7. The method of claim 1, wherein transforming the noisy frequency-domain channel estimate comprises:
performing an N point inverse discrete Fourier transformation on the noisy frequency-domain channel estimate, where N is a total number of taps in the noisy frequency-domain channel estimate, to form a noisy time-domain channel estimate;
padding m−1 zeros after each sample of the noisy time-domain channel estimate; and
lowpass filtering the zero-padded noisy time-domain channel estimate.

8. The method of claim 1, wherein the noisy frequency-domain channel estimate is obtained from an orthogonal frequency division multiplex channel.

9. The method of claim 8, wherein the noisy frequency-domain channel estimate is a linear minimum mean square error estimate.

10. A noisy frequency-domain channel estimate enhancer, comprising:
an over-sampler configured to transform the noisy frequency-domain channel estimate into a time-domain channel estimate that is virtually over-sampled by an integer factor m;
a de-interleaver configured to divide the time-domain channel estimate into m de-interleaved sub-vectors;
a suppressor configured to suppress noisy taps from each de-interleaved sub-vectors to form m noise suppressed sub-vectors;
a selector configured to select a noise suppressed sub-vector associated with a highest signal-to-noise ratio;
a discrete Fourier transformer configured to transform the selected noise suppressed sub-vector into a noise suppressed preliminary frequency-domain channel estimate; and
a phase-shifter configured to phase-adjust the taps of the noise suppressed preliminary frequency-domain channel estimate to form an enhanced frequency-domain channel estimate.

11. The enhancer of claim 10, wherein the suppressor includes:
a position detector configured to determine a respective position of a peak power tap for each interleaved sub-vector;
a threshold detector configured to detect a respective noise threshold for each sub-vector; and
a tap noise suppressor configured to suppress taps with a power that falls below the respective noise threshold and are positioned within a predetermined channel length from the determined respective position as well as taps that are not positioned within the channel length from the determined respective position, while leaving the peak power tap unchanged.

12. The enhancer of claim 10, wherein the phase-shifter is configured to phase shift taps $H'_k$ of the noise suppressed preliminary frequency-domain channel estimate in accordance with:

$$H'_k \cdot \exp\left(-j \cdot 2\pi \cdot \frac{i0}{m} \cdot \frac{k}{N}\right)$$

where
k is a tap index,
N is a total number of taps in the frequency-domain channel estimate, and
i0 is a peak position in the noise suppressed preliminary frequency-domain channel estimate.

13. The enhancer of claim 10, wherein the selector includes:
a power estimator configured to estimate a respective total power measure for each noise suppressed sub-vector;
a signal-to-noise ratio calculator configured to determine a signal-to-noise ratio associated with each noise suppressed sub-vector based on the corresponding estimated total power measure and a corresponding estimated noise level measure; and
sub-vector selector configured to select a noise suppressed sub-vector associated with a highest calculated signal-to-noise ratio.

14. The enhancer of claim 10, wherein the de-interleaver is configured to form m de-interleaved sub-vectors $h_i$ in accordance with:

$$h_i = [h_{0,i}, h_{1,i}, \ldots, h_{n,i}, \ldots, h_{N-1,i}],$$
$$i = -\max\left(\left\lceil \frac{m}{2} \right\rceil - 1, 0\right), \ldots, \left\lfloor \frac{m}{2} \right\rfloor$$

where
$h_{n,i} = h_{mod(i+nm,mN)}$, n=0, 1, ..., N−1,
N is a total number of taps in the noisy frequency-domain channel estimate,
⌈ ⌉ is a ceiling function, and
⌊ ⌋ is a floor function.

15. The enhancer of claim 10, wherein the over-sampler includes:
a zero-padder configured to zero-pad the noisy frequency-domain channel estimate with (m−1)·N zeros, where N is a total number of taps in the noisy frequency-domain channel estimate; and
an inverse discrete Fourier transformer configured to perform an m·N point inverse discrete Fourier transformation on the zero-padded noisy frequency-domain channel estimate.

16. The enhancer of claim 10, wherein the over-sampler includes:
an inverse discrete Fourier transformer configured to perform an N point inverse discrete Fourier transformation on the noisy frequency-domain channel estimate, where N is a total number of taps in the noisy frequency-domain channel estimate, to form a noisy time-domain channel estimate;
a zero-padder configured to pad m−1 zeros after each sample of the noisy time-domain channel estimate; and
a lowpass filter configured to lowpass filter the zero-padded noisy time-domain channel estimate.

17. The enhancer of claim 10, wherein the enhancer is included in a radio communication system receiver.

* * * * *